United States Patent [19]
Newell

[11] Patent Number: 6,111,588
[45] Date of Patent: Aug. 29, 2000

[54] CREATING AND MODIFYING CURVES ON A COMPUTER DISPLAY

[75] Inventor: Martin E. Newell, Palo Alto, Calif.

[73] Assignee: Adobe Systems Incorporated, San Jose, Calif.

[21] Appl. No.: 08/761,186

[22] Filed: Dec. 5, 1996

[51] Int. Cl.$^7$ .................................................. G06T 11/00
[52] U.S. Cl. ........................ 345/442; 345/440; 345/441
[58] Field of Search .................................. 345/440–442, 345/439, 138, 139

[56] References Cited

U.S. PATENT DOCUMENTS

| | | | |
|---|---|---|---|
| 4,760,548 | 7/1988 | Baker et al. | 364/718.01 |
| 4,791,581 | 12/1988 | Ohba | 345/425 |
| 4,835,722 | 5/1989 | Clarke et al. | 364/720 |
| 5,253,336 | 10/1993 | Yamada | 345/442 |
| 5,269,000 | 12/1993 | Ohuchi | 345/442 |
| 5,287,441 | 2/1994 | Nakamura | 345/442 |
| 5,317,682 | 5/1994 | Luken, Jr. | 345/442 |
| 5,337,404 | 8/1994 | Baudelaire et al. | 345/441 |
| 5,345,546 | 9/1994 | Harada et al. | 345/442 |
| 5,367,617 | 11/1994 | Goossen et al. | 345/442 |
| 5,412,770 | 5/1995 | Yamashita et al. | 345/442 |
| 5,500,927 | 3/1996 | Sander-Cederlof et al. | 345/433 |
| 5,557,719 | 9/1996 | Ooka et al. | 345/441 |
| 5,566,288 | 10/1996 | Koerhsen | 345/442 |
| 5,588,100 | 12/1996 | Parker | 345/442 |
| 5,594,852 | 1/1997 | Tankelevich | 345/441 |
| 5,615,319 | 3/1997 | Metzger et al. | 345/427 |
| 5,694,535 | 12/1997 | Broekhuijsen | 345/442 |
| 5,715,473 | 2/1998 | Reed | 395/805 |

OTHER PUBLICATIONS

Ashlar Incorporated, *Ashlar–Vellum Design and Drafting Software that Thinks*, Tutorial MS–DOS with Windows 3.0, pp. 52–53, 106–109 (1990).

Burger & Gillies, *Interactive Computer Graphics: Functional Procedural and Device–Level Methods*, Addison–Wesley Publishing Compay, pp. 1–31, 241–300 (1989).

A. Finkelstein & D. Salesin, *Multiresolution Curves*, Computer Graphics Proceedings, Annual Conference Series, pp. 261–268 (1994).

E. Stollnitz et al., *Wavelets for Computer Graphics: Theory and Applications*, Morgan Kauffmann Publishers, Inc., San Francisco, California, pp. 109–120 (1996).

Fowler and Bartels, "Constraint–Based Curve Manipulation," IEEE Computer Graphics & Applications, Sep. 1993, pp. 43–49.

*Primary Examiner*—Mark K. Zimmerman
*Assistant Examiner*—Albert K. Lee
*Attorney, Agent, or Firm*—Fish & Richardson P.C.

[57] ABSTRACT

A computer-implemented method modifies a curve in response to a user action through a graphical user interface in the computer system, with the curve being defined by control points. Each of the control points is identified in response to user input as a fixed control point, a selected control point, or a free control point. A displacement of selected points is received, and a free slope control point of the curve is mapped to a point Tp on a line t. An interpolation curve IC(t) is defined on the line t, and a point Tp is projected to the value of the interpolation curve IC(t) at t equals Tp to find a scale factor. The scale factor is multiplied by the displacement of the selected points to determine the displacement of the free control point. A computer-implemented graphical user interface method creates a Bezier curve segment on a display in a computer system. A selection of a first segment end point is received through a graphical user interface in the computer system. The position of a cursor on the computer display is received as a second segment end point. The first and second slope points are calculated so that the Bezier segment defined by the first and second segment end points and the first and second slope points approximates an arc. The calculated Bezier curve segment is displayed on the computer display.

30 Claims, 9 Drawing Sheets

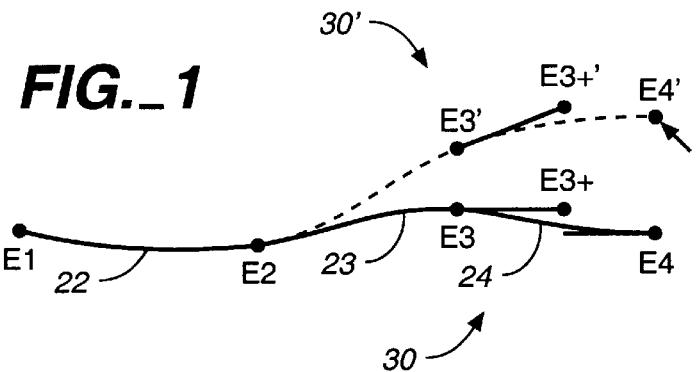
FIG._1
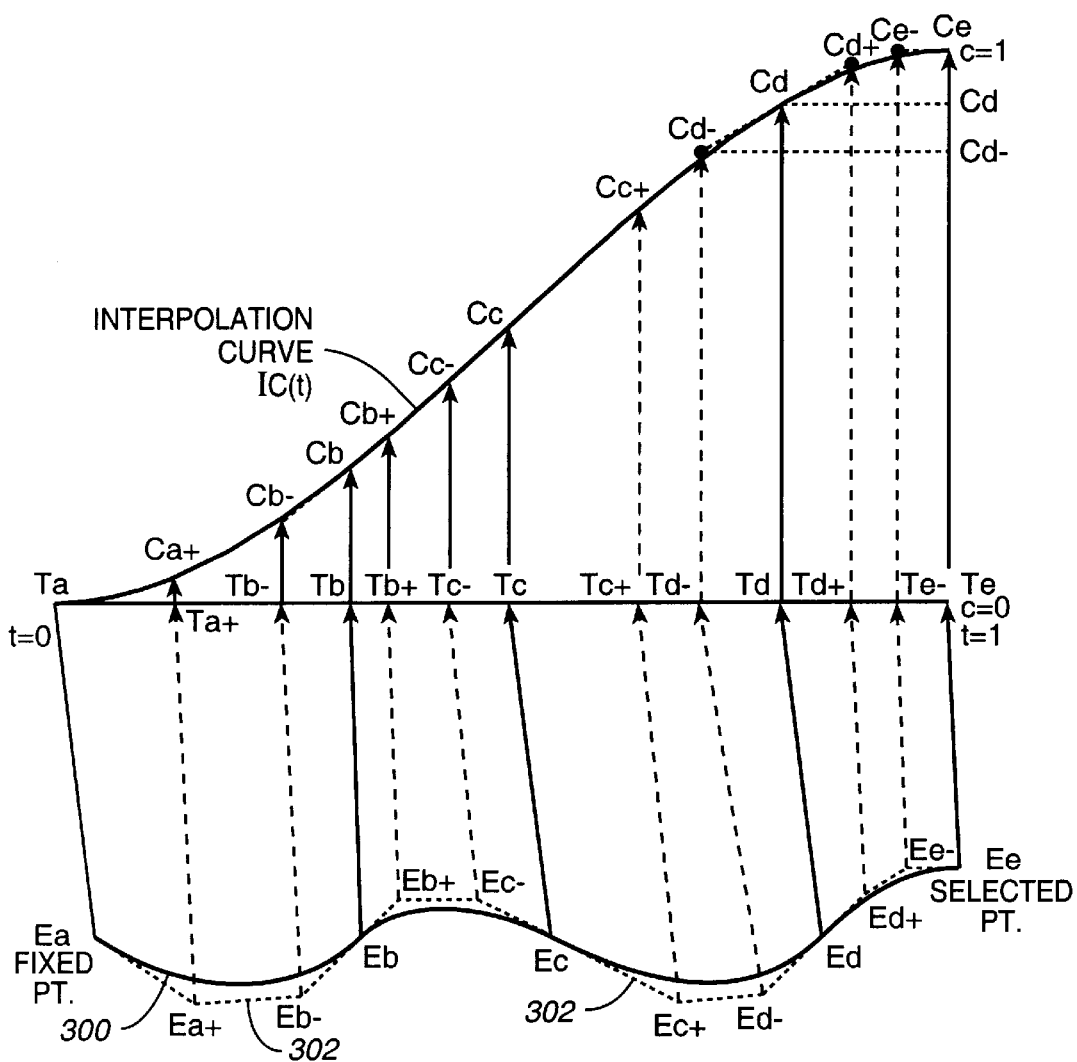
FIG._2A

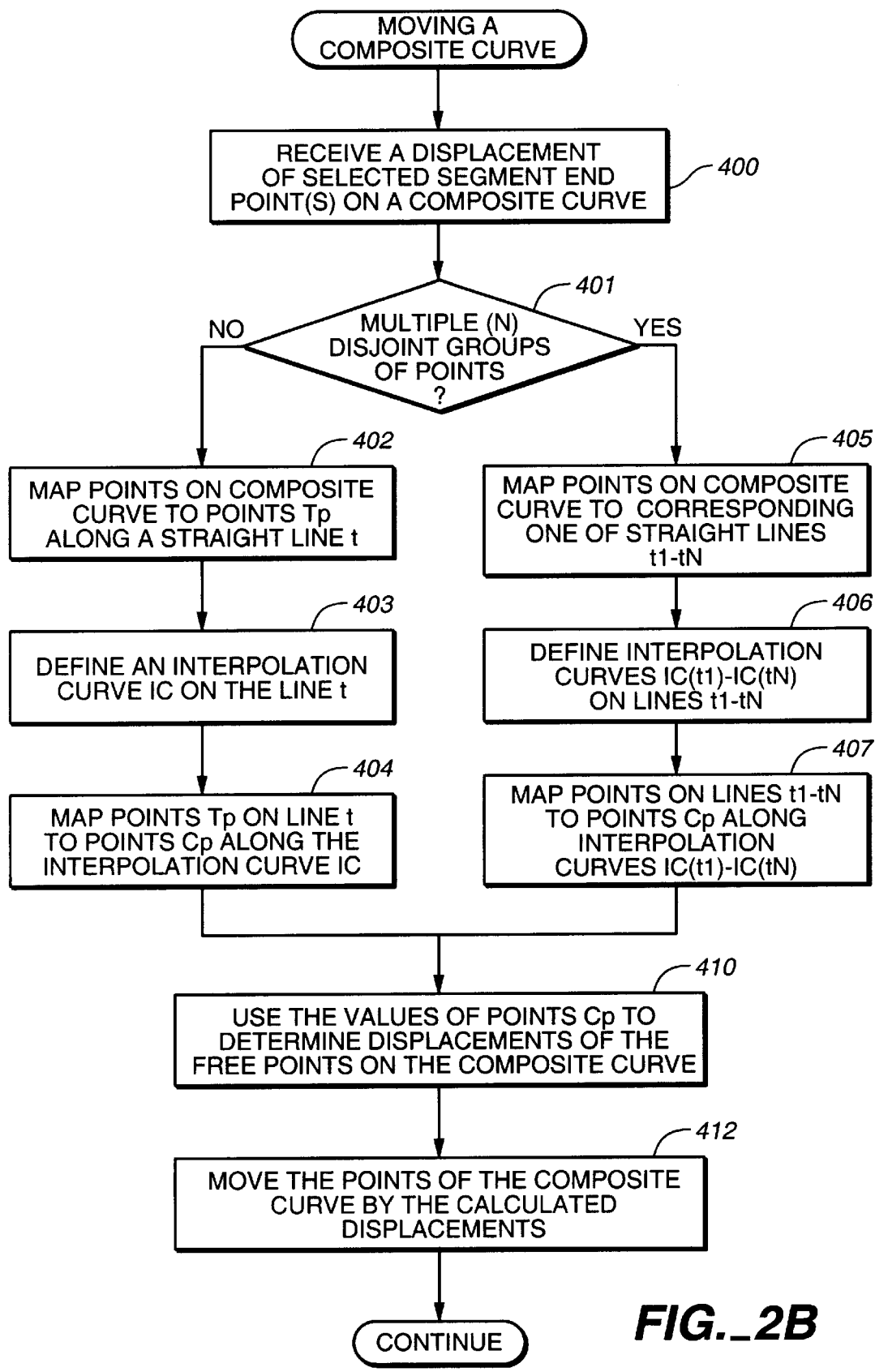
FIG._2B

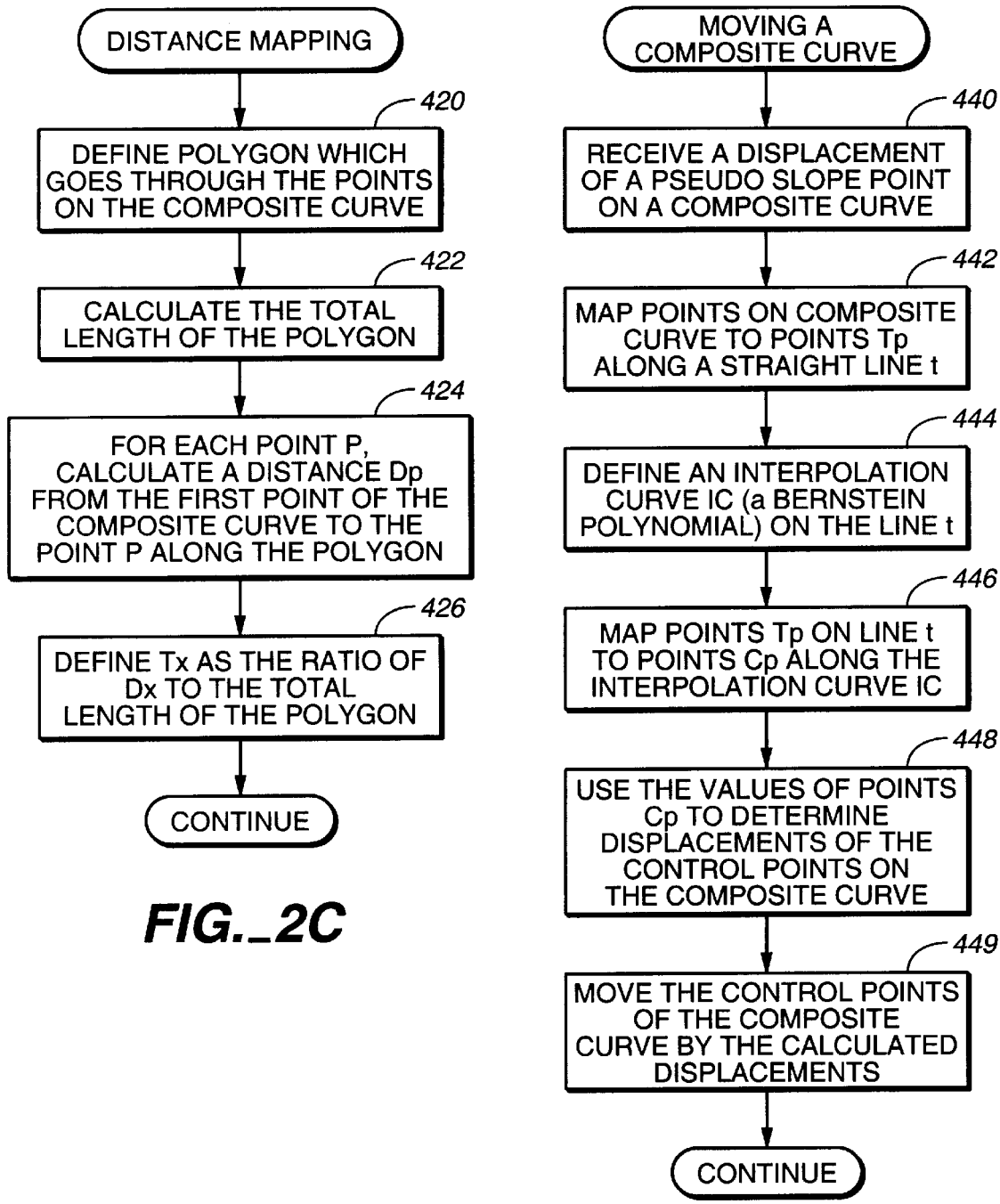
FIG._2C
FIG._2E

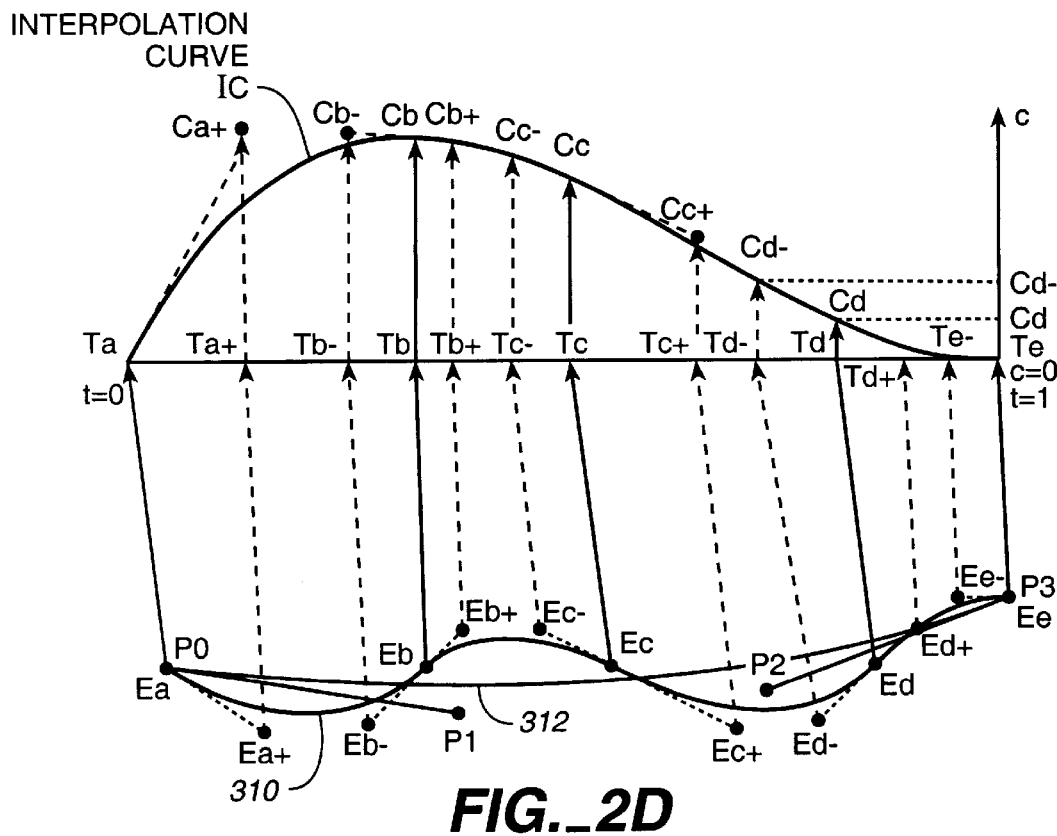
FIG._2D
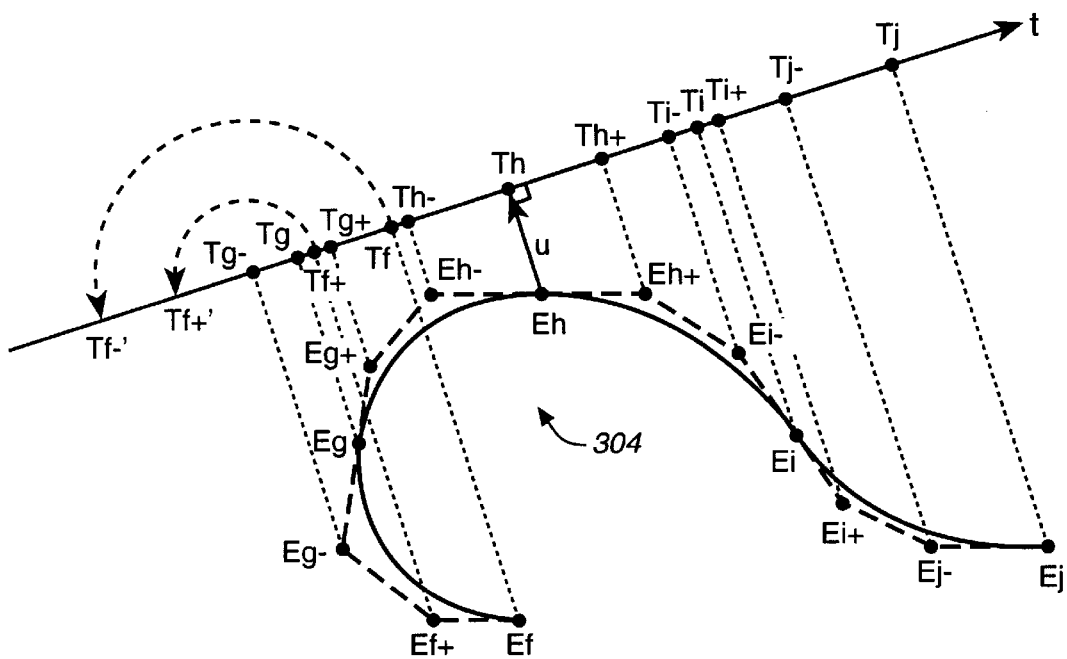
FIG._3

FIG._4
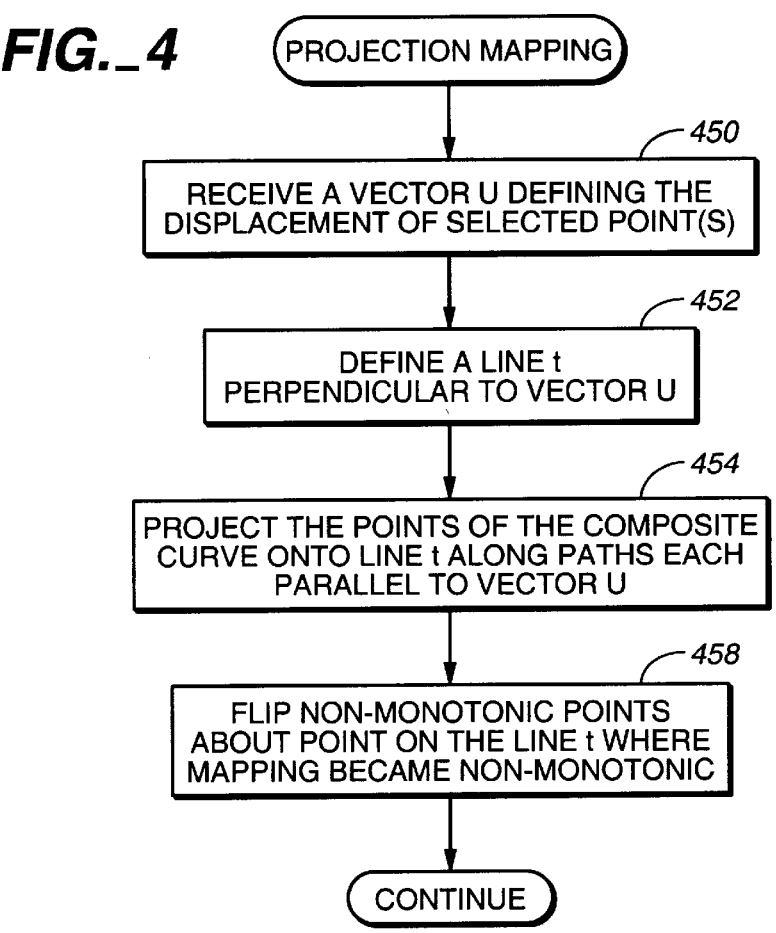
FIG._5
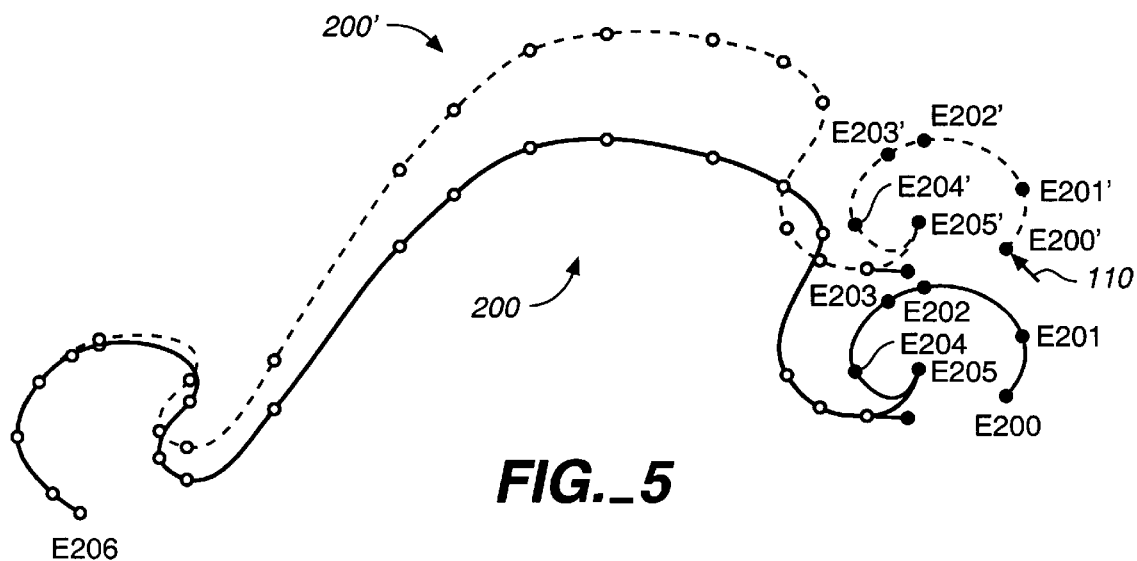

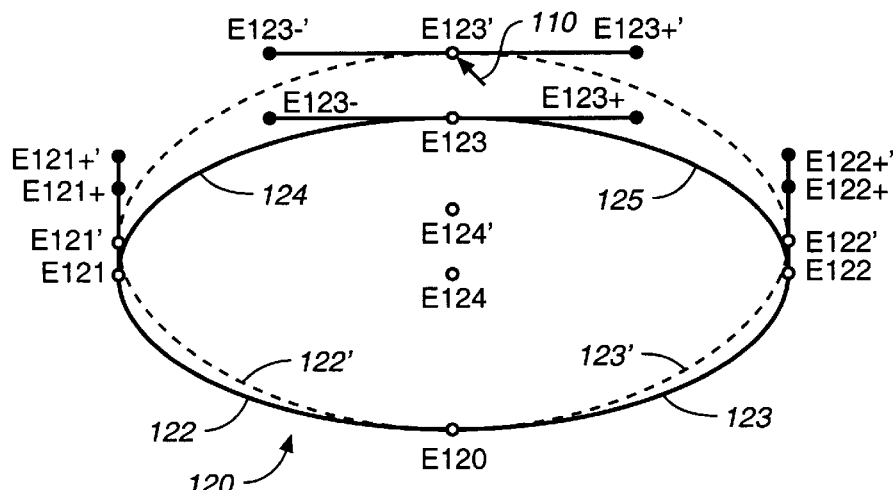
FIG._6
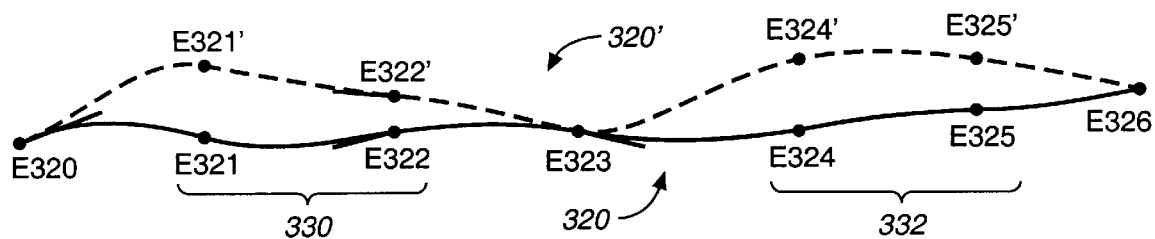
FIG._7A
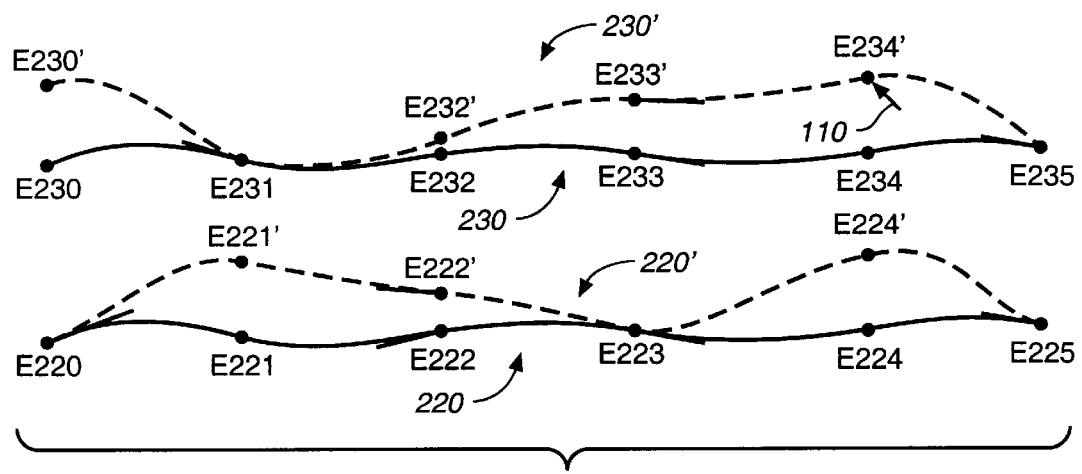
FIG._7B

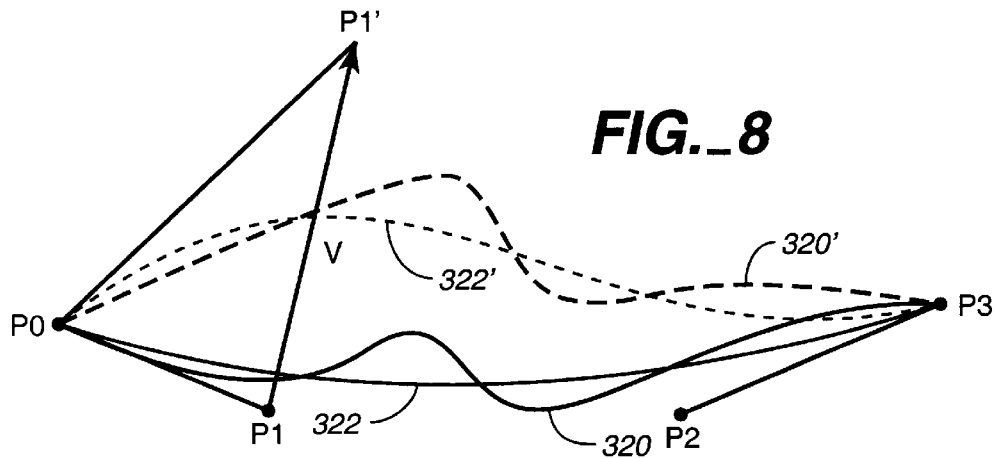
FIG._8
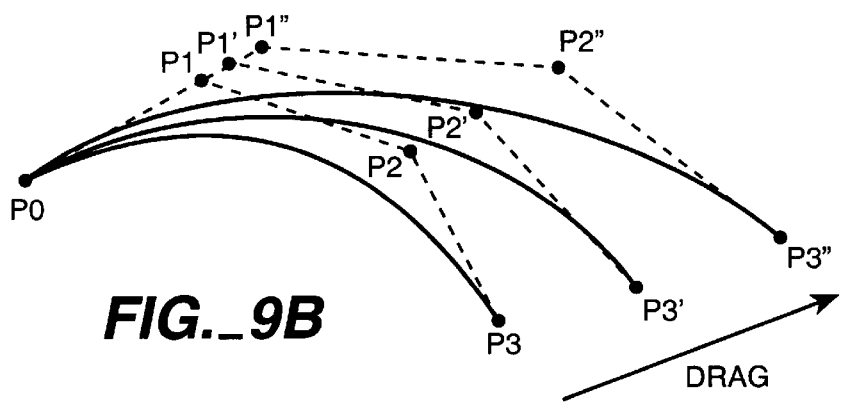
FIG._9B
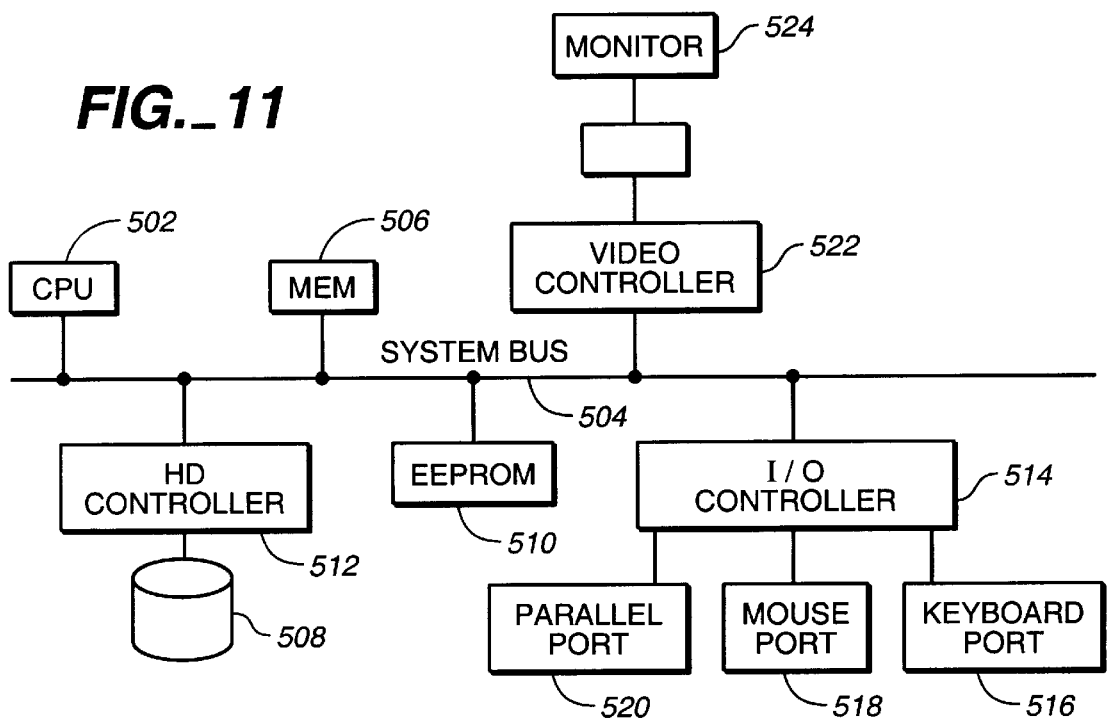
FIG._11

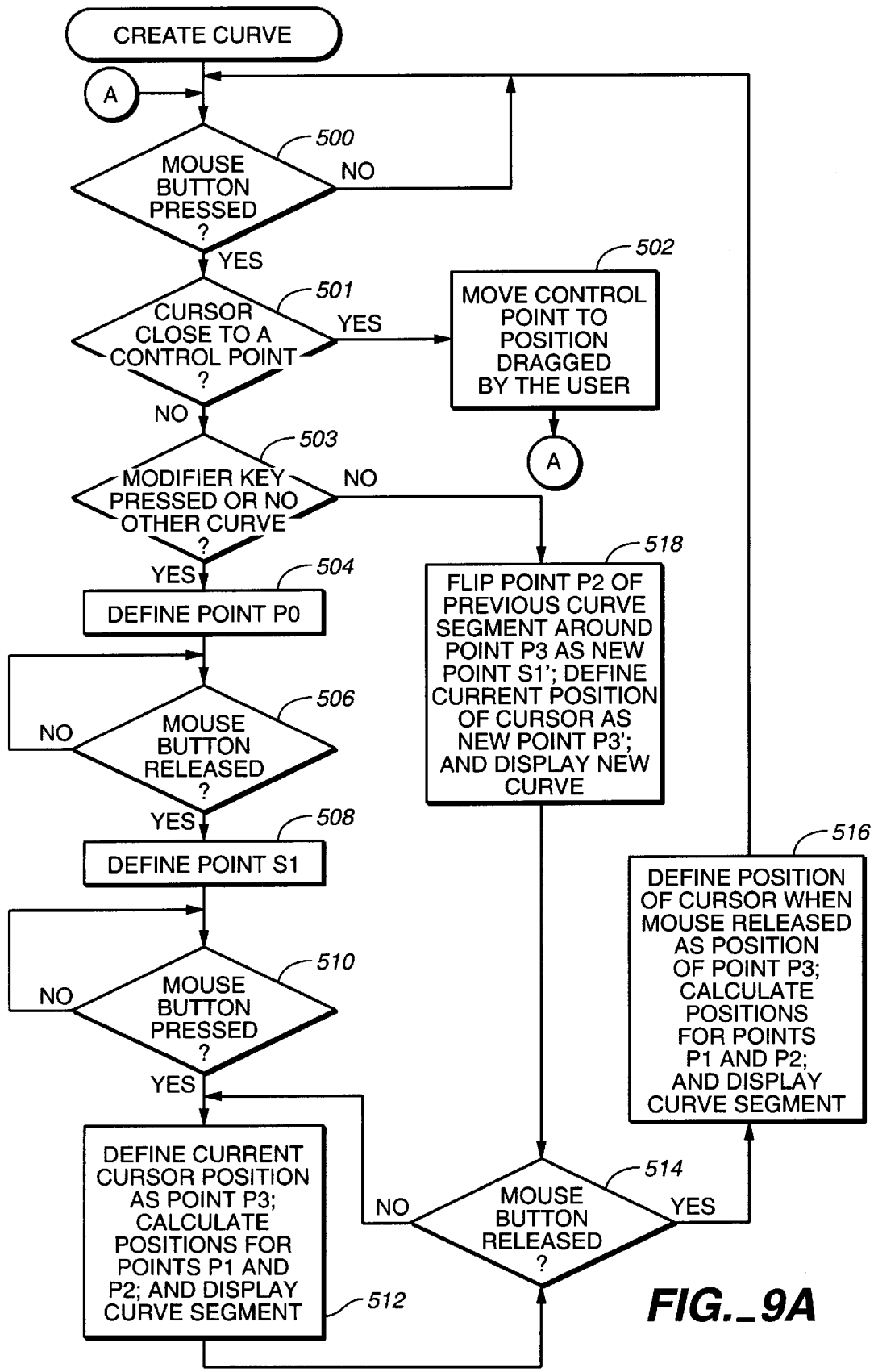
FIG._9A

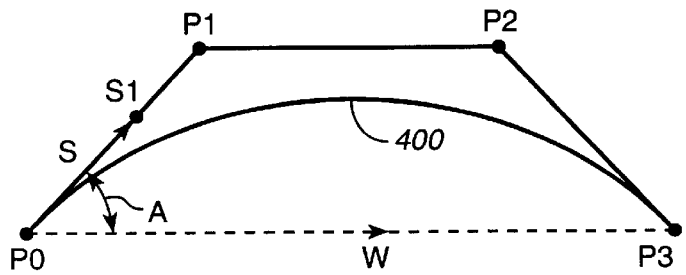
FIG._10A
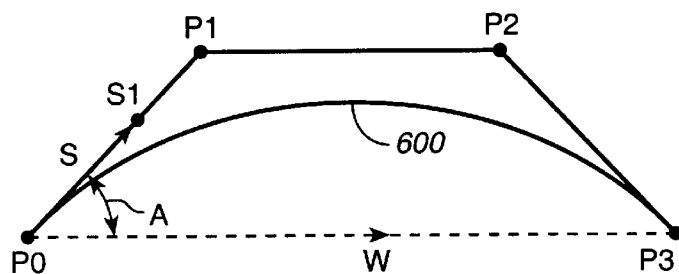
FIG._10B
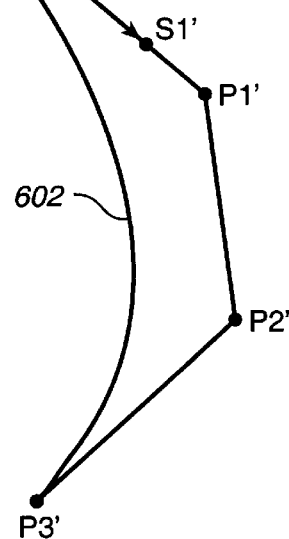
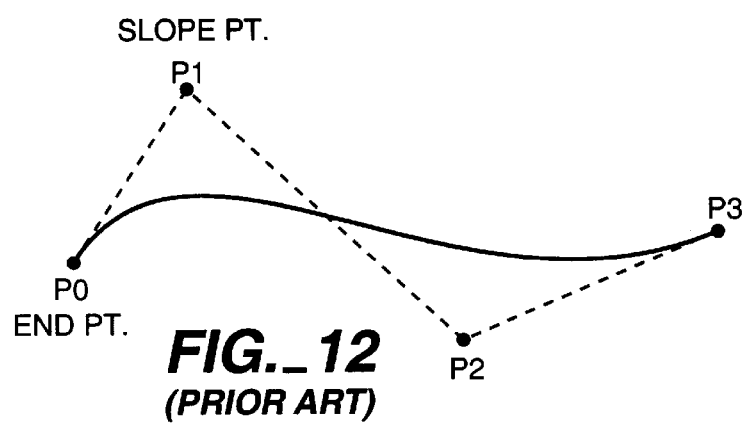
FIG._12
*(PRIOR ART)*

CREATING AND MODIFYING CURVES ON A COMPUTER DISPLAY

BACKGROUND

The invention relates to creating and modifying curves on a computer display.

Curves in graphics programs, such as the Illustrator program from Adobe Systems Incorporated in San Jose, Calif., can be created on a computer display by a user using free-hand motion of a mouse. Generally, such curves are represented as constructs of control points. For example, for a third-order Bezier curve segment (as shown in FIG. 12), four control points are used in which two control points P0 and P3 are segment end points (through which the curve segment passes), and the two control points P1 and P2 are slope points defining the slope of the curve segment at the segment end points P0 and P3.

A composite curve can be formed by concatenating multiple Bezier curve segments. In some prior systems, such as in the Adobe Illustrator system, a user can modify a composite curve by selecting and dragging control points. The grabbed points then move by the distance specified by the cursor. In other systems, such as that discussed in U.S. Pat. No. 5,412,770, a point on a curve can be fixed and a segment of the curve can be reshaped by moving a cursor on a computer display. In another prior system, a composite curve can be modified by dragging a control point after fixed points are specified on the composite curve.

SUMMARY

In general, in one aspect, the invention features a computer-implemented method modifying a curve in response to a user action through a graphical user interface in a computer system. The curve is defined by a plurality of control points. Each of the control points is identified in response to user input as a fixed control point, a selected control point, or a free control point. A displacement of a plurality of selected points is received. A free control point of the curve is mapped to a point Tp on a line t. An interpolation curve IC(t) is defined on the line t. The point Tp is projected to the value of the interpolation curve IC(t) at t equals Tp to find a scale factor. The scale factor is multiplied by the displacement of the selected points to determine the displacement of the free control point.

In general, in another aspect, the invention features a computer-implemented method modifying a plurality of curves in response to a user action through a graphical user interface in a computer system, wherein each curve is defined by a plurality of control points. Each of the control points is identified in response to user input as a fixed control point, a selected control point, or a free control point. A displacement of a selected point of each curve is received. A free control point of each curve is mapped to a point of a corresponding one of a plurality of lines. An interpolation curve is defined on each line. The point on each line is projected to the corresponding interpolation curve to find a scale factor for each free control point. The scale factors are multiplied by the displacement of the selected control points to determine the displacements of the free control points.

In general, in another aspect, the invention features a computer-implemented graphical user interface method creating a Bezier curve segment on a display in a computer system. A selection of a first segment end point is received through a graphical user interface in the computer system. The position of a cursor on the computer display is received as a second segment end point. First and second slope points are calculated so that the Bezier segment defined by the first and second segment end points and the first and second slope points approximates an arc. The calculated Bezier curve segment is displayed on a computer display.

In general, in another aspect, the invention features a computer program residing on a computer-readable medium for modifying a curve in response to a user action through a graphical user interface in a computer system. The curve is defined by a plurality of control points. The computer program includes instructions for causing the computer system to identify in response to user input each of the control points as a fixed control point, a selected control point, or a free control point. The instructions also cause the computer system to receive a displacement of a plurality of selected points, map a free control point of the curve to a point Tp on a line t, and define an interpolation curve IC(t) on the line t. The instructions further cause the computer system to project the point Tp to the value of the interpolation curve IC(t) at t equals Tp to find a scale factor, and the scale factor is multiplied by the displacement of the selected points to determine the displacement of the free control point.

In general, in another aspect, the invention features a computer program residing on a computer-readable medium for modifying a plurality of curves in response to user action through a graphical user interface in a computer system. Each curve is defined by a plurality of control points. The computer system includes instructions for causing the computer system to identify in response to user input each of the control points as a fixed control point, a selected control point, or a free control point. The instructions also cause the computer system to receive a displacement of a selected point of each curve, map a free control point of each curve to a point of a corresponding one of a plurality of lines, and define an interpolation curve on each line. The instructions further cause the computer system to project the point on each line to the corresponding interpolation curve to find a scale factor for each free control point, and to multiply the scale factors by the displacement of the selected control points to determine the displacements of the free control points.

In general, in another aspect, the invention features a computer program residing on a computer-readable medium for creating a Bezier curve segment. The computer program includes instructions for causing the computer system to receive a selection of a first segment point through a graphical user interface in a computer system, and to receive the position of a cursor on a computer display as a second segment end point. The instructions also cause the computer system to calculate first and second slope points so that the Bezier segment defined by the first and second end points and the first and second slope points approximates an arc, and to display the calculated Bezier curve segment on a computer display.

In general, in another aspect, the invention features a computer-implemented method modifying a curve in response to a user action through a graphical user interface in a computer system, with the curve being defined by a plurality of control points and having two curve end points. A slope adjustment point is defined, and a displacement is received through the graphical user interface of the slope adjustment point. A control point of the curve is mapped to a point Tp on a line t, an interpolation curve IC(t) is defined on the line t. The point Tp is projected to the value of the interpolation curve IC(t) at t equals Tp to find a scale factor, and the scale factor is multiplied by the displacement of the selected points to determine the displacement of the free control point.

In general, in another aspect, the invention features a computer program residing on a computer-readable medium for modifying a curve in response to a user action through a graphical user interface in a computer system with the curve being defined by a plurality of control points. The computer program includes instructions for causing the computer system to define a slope adjustment point and to receive a displacement through the graphical user interface of the slope adjustment point. The instructions further cause the computer system to map a control point of the curve to a point Tp on a line t, to define an interpolation curve IC(t) on the line t, to project the point Tp to the value of the interpolation curve IC(t) at t equals Tp to find a scale factor, and to multiply the scale factor by the displacement of the selected points to determine the displacement of the free control point.

Among the advantages made of the invention are one or more of the following. Multiple fixed points can be specified and multiple selected points can be selected and moved rigidly as a group. Points on multiple curves can be selected and moved. The points of the curve are moved so as to maintain the general shape and details of the original curve and to maintain the smoothness of the transitions between segments of the curve. A user can select any portion of a curve to be modified and the smoothness of the rest of the curve is maintained. The slope of a composite curve at end points can be adjusted.

Other features and advantages of the invention will become apparent from the following description and from the claims.

BRIEF DESCRIPTION OF THE DRAWINGS

FIG. 1 is a diagram showing movement of a composite curve on a computer display.

FIG. 2A is a diagram illustrating a two-step mapping scheme used to calculate the displacement of control points defining a composite curve in response to movement of selected segment end points.

FIG. 2B is a flow diagram of the two-step mapping scheme.

FIG. 2C is a flow diagram of a distance mapping method used in the two-step mapping scheme.

FIG. 2D is a diagram of a two-step mapping scheme of the modification of the slope of a composite curve at a curve end point.

FIG. 2E is a flow diagram of the two-step mapping scheme of the modification of the slope of a composite curve at a curve end point.

FIG. 3 is a diagram of a projection mapping method to map points on a composite curve to an orthogonal line.

FIG. 4 is a flow diagram of the projection mapping method.

FIG. 5 is a diagram showing movement of a composite curve in which multiple control points are selected and moved rigidly as a group.

FIG. 6 is a diagram showing movement of a closed-path curve.

FIG. 7A is a diagram showing movement of a composite curve having disjoint groups of moved points.

FIG. 7B is a diagram showing movement of two composite curves.

FIG. 8 is a diagram showing modification of the slope of a composite curve at a curve end point.

FIG. 9A is a flow diagram of a method creating a Bezier curve segment.

FIG. 9B is a diagram showing of a Bezier curve segment being created by a user.

FIG. 10A is a diagram of a Bezier curve segment along with associated control points and vectors.

FIG. 10B is a diagram of a composite curve having multiple Bezier curve segments.

FIG. 11 is a block diagram of a computer system.

FIG. 12 is a diagram of a Bezier curve segment.

DETAILED DESCRIPTION

In a graphics program embodying the present invention, when a portion of a composite curve is selected to be modified or distorted in a manner specified by a user, other portions of the curve are modified to maintain the general shape and details of the curve and to maintain smooth transitions between the segments of the entire curve. For example, if a composite curve includes hundreds of curve segments defining many details in the curve, the program will retain the details of the original composite curve after the modification operation. With the program, the user does not need to manually adjust the segments of the composite curve to retain the details and smoothness of the curve.

In addition, the program also allows a user to adjust the slope of a composite curve at its curve end points. A slope adjustment point is provided which is selectable by the user to modify the slope by any desired amount.

Referring to FIG. 1, a composite curve is made up of a number of segments connected end to end. To illustrate the conventions that will be used in identifying parts of a curve, composite Bezier curve 30 has three Bezier segments 22, 23, and 24. The end points of segments are identified with the letter E followed by a number: in this example the segment end points are E1 through E4. The curve end points are E1 and E4. A segment end point that is not a curve end point is shared by two segments: in this example, these are E2 and E3. In addition to end points, Bezier segments have another kind of control point, the slope point. Each end point in a segment is associated with one slope point. In the Bezier segment shown in FIG. 12, end points P0 and P3 are associated with slope points P1 and P2, respectively. In the curve 30 of FIG. 1, the slope points associated with an end point En are identified as En+ and En−. For example, the slope point of segment 22 associated with E2 is E2−, while the slope point of segment 23 associated with E2 is E2+. When a curve or a portion of a curve is moved, control points are moved. The control points in their new, post-move positions are identified by an apostrophe. If two moves are shown, the second positions are identified by two apostrophes, and so on. In FIG. 1, new control points E3', E3+', and E4' are shown. A segment end point may also be identified generically as P, and its associated slope control points as P+ and P−. Further, the slope of the composite curve at its curve end points can also be adjusted by the user by selecting what are referred to as "pseudo" slope points, which are described below in connection with FIGS. 2D, 2E, and 8.

When a user moves a curve, the user marks each control point as being of one of three types: selected, free, and fixed. Normally, all control points will be free by default, and user actions will explicitly mark (through the graphical user interface of the program) particular control points as selected or fixed. Slope points of the curve segments are invisible to the user on the graphical user interface of the program, and thus cannot be marked as selected or fixed. Alternatively, the segment end points can default to fixed points (while slope points default to free points), with the user having to mark which segment end points are free or selected.

Selected points are those points that move as a rigid group by a displacement specified by the user. Fixed points are those points that do not move. Free points are all other points whose displacements are calculated as will be described. However, the free points (including slope points E1+ and E2−) that are bounded solely by fixed points will remain in place. In addition, free points bounded solely by selected points normally will move with the selected points, depending upon the nature of the curve modification. Free segment end points are moved so as to maintain the general shape of the curve. Free slope points are moved so as to maintain smooth transitions between curve segments.

Referring to FIGS. 2A–2C, a program determines the displacements of each free end point P along with associated slope points P− and P+ using an algorithm that performs a two-step mapping function. Referring to FIG. 2B, the program receives at step 400 a displacement V of a selected end point or selected end points on a composite curve. Next, the program determines at step 401 if there are two or more disjoint groups of points. In a move operation that involves multiple disjoint groups of points to be moved, multiple separate mappings are performed. Two groups of selected points are considered disjoint if they are separated by a fixed point. Further, disjoint groups of control points also can occur if multiple composite curves are being moved at the same time. In the multiple-curve case, each composite curve is considered to contain at least one disjoint group of control points.

If there are not multiple disjoint groups of control points, then the control points on the composite curve are mapped at step 402 to points on one unit line segment t [0,1], as shown in FIG. 2A, using either a distance mapping method (FIG. 2C) or a projection mapping method (FIGS. 3A and 3B). Each segment end point Ep (or simply P) on the composite curve is mapped to a point called Tp on t; each slope point Ep+ or Ep− (or simply P+ or P−), to a parameter Tp+ or Tp−.

Next, one interpolation curve IC is defined at step 403 on t. The points Tp are projected perpendicularly at step 404 from t onto the interpolation curve IC to obtain the values of parameters Cp. Each value Cp is the ordinate of the interpolation curve IC evaluated at t=Tp.

Points Tp− and Tp+ associated with slope points P− and P+ (the prefix E for the control points are omitted for clarity) are projected perpendicularly at step 404 from t to intersect the tangent to IC at t=Tp to obtain parameters Cp− and Cp+. Cp− and Cp+ are the ordinates at t=Tp− and Tp+, respectively, of the tangent line.

The shape of the interpolation curve IC(t) determines the value of parameters Cp, Cp−, and Cp+ and thus the amount of displacement of each of the free points. Generally, a cubic interpolation curve IC(t) is optimal for most applications involving third order Bezier segments. A differently shaped interpolation curve, such as a fifth degree polynomial or even a sine wave, will cause the free points to move differently. Selection of the shape of the interpolation curve IC(t) is application specific and is normally done by the manufacturer of the graphics program to produce the optimal behavior of the free points for the specific application. Once the interpolation curve IC(t) is set, then the same interpolation curve defined on the line segment t will be used for all curve distort operations.

FIG. 2A shows an interpolation curve IC associated with one portion 300 of a composite curve in which point Ee is a selected point and point Ea is a fixed point. For additional free points extending from the selected point Ee to another fixed point, the interpolation curve IC is extended from Ce down to the line t on the other side of point Ee to form generally a bell-shaped curve.

If multiple (N) disjoint groups exist, then each group of control points is mapped at step 405 to points Tp, Tp−, and Tp+ on a corresponding one of unit line segments t1–tN. Next, interpolation curves IC(t1)–IC(tN) are defined at step 406 on the line t1–tN, respectively, and points on the line segments t1–tN are in turn mapped at step 407 to parameters Cp, Cp−, and Cp+ on the interpolation curves IC(t1)–IC(tN). Again, the same interpolation curve IC is used in each case as defined on line segment t [0, 1].

From step 404 or 407, the program calculates displacements for each free control point P, P−, and P+ using the parameters Cp, Cp−, and Cp+. The program then moves at step 412 the free points by the calculated displacements.

In step 410, the displacements are expressed in terms of new positions P−', P', and P+' using the parameters Cp−, Cp or Cp+ as scale factors to scale the vector displacement V. Each scaled displacement is then added to the corresponding original point to derive new points P−', P', and P+', as shown in Eqs. 1–3.

$$P-' = P- + V*Cp- \qquad \text{(Eq. 1)}$$

$$P' = P + V*Cp \qquad \text{(Eq. 2)}$$

$$P+' = P+ + V*Cp+ \qquad \text{(Eq. 3)}$$

One constraint in mapping the sequence of control points defining the composite curve to the line segment t is that the mapping must be monotonic and axis-independent. Thus, for any given segment end point P, Equation 4 must be satisfied.

$$(Tp+ - Tp)/(Tp - Tp-) = |(P+ - P)|/|(P - P-)| \qquad \text{(Eq. 4)}$$

Equation 4 ensures that if the vectors (P+−P) and (P−P−) are collinear in the original composite curve (as is required for a smooth Bezier curve), then the vectors will remain collinear in the distorted curve.

Referring to FIG. 2A, the process of FIG. 2B is applied below to a "bendable" section 300 of a composite curve, that is, the section between the fixed point Ea and the selected point Ee. The other segment end points Eb, Ec, and Ed and slope points Ea+, Eb−, Eb+, Ec−, Ec+, Ed−, Ed+, and Ee− are free points whose displacements are calculated. In the first mapping step (step 402), the fixed segment end point Ea and the selected segment end point Ee are mapped to parameters Ta and Te, and the free points Ea+, Eb−, Eb, Eb+, Ec−, Ec, Ec+, Ed−, Ed, Ed+, and Ee− are mapped to parameters Ta+, Tb−, Tb, Tb+, Tc−, Tc, Tc+, Td−, Td, Td+, and Te−, respectively, along line t.

In FIG. 2A, distance mapping is used to map the control points of the curve 300 to the line t. Referring further to FIG. 2C, a polyline 302 is first defined at step 420 that includes line segments that pass through the control points Ea, Ea+, Eb−, Eb, Eb+, Ec−, Ec, Ec+, Ed−, Ed, Ed+, Ee− and Ee.

Next, the total length L of the polyline 302 is calculated at step 422. Then, for each point P, P−, or P+, a length Dp, Dp−, or Dp+(length of polyline 302 from point Ea to point Ep, Ep−, or Ep+) is calculated at step 424. The parameter Tx (x=a, a+, b−, b, b+, c−, c, c+, d−, d, d+, e−, e) is calculated at step 426 by dividing a distance Dx (length of polyline 302 from point Ea to point Ex) over the total length L of the polyline 302. Thus, for example, the parameter Ta has value zero, since the length from point Ea to itself is zero. The parameter Ta+ is the length Da+ of the polyline 302 from point Ea to point Ea+ divided by the total length L of the polyline 302. The parameter Tb− is the length Db− of the polyline 302 from point Ea to Ea+ and from Ea+ to Eb− divided by the total length L of the polyline 302. The other parameters Tb through Te are calculated in similar fashion. Since the line segment t is defined between 0 and 1, the value of parameter Te is 1.

Effectively, distance mapping causes the points Ea through Ee to be mapped onto the straight line t according to the Euclidean distance between each point.

FIG. 2A shows mapping to line segment t between the values 0 and 1. Alternatively, the mapping could be to a line segment t between any two arbitrary values as long as the distance relationships between the control points on the polyline are maintained.

Although one advantage of distance mapping is its simplicity, it also has limitations. One limitation of distance mapping is that the distortion of the composite curve is not reversible. Thus, for example, if a selected control point is then moved through a vector V to distort the curve, and the point is then moved through the opposite vector −V, the curve control points will not always return to their original locations if distance mapping is used.

Projection mapping, another mapping scheme for mapping points onto the line t, avoids this limitation in certain cases. Referring to FIGS. 3 and 4, the program first receives at step 450 a vector U that defines the direction of movement of a selected point or points. Thus, for a composite curve 304 defined by segment end points Ef, Eg, Eh, Ei, and Ej (and associated slope points Ef+, Eg−, Eg+, Eh−, Eh+, Ei−, Ei+, and Ej−), in which segment end point Eh is the selected point and points Ef and Ej are the first neighboring fixed points, the vector U points in the direction of movement of segment end point Eh.

Using projection mapping to determine the parameters Tf, Tg, Th, Ti, and Tj, line t is defined at step 452 to be perpendicular to the vector U. Next, each of the control points Ef, Ef+, Eg−, Eg, Eg+, Eh−, Eh, Eh+, Ei−, Ei, Ei+, Ej−, and Ej is projected at step 454 onto the line t along a path that is parallel to the vector U to obtain a corresponding parameter Tf, Tf+, Tg−, Tg, Tg+, Th−, Th, Th+, Ti−, Ti, Ti+, Tj−, and Tj.

Thus, whereas distance mapping attempts to define the parameters Tp, Tp−, and Tp+ according to the relative distances of control points from each other on a composite curve, projection mapping maps control points along corresponding parallel vectors to an orthogonal line t.

Another mapping scheme can be used to map onto the line t. In this third scheme, assuming there are N+1 control points, the control points are mapped onto the straight line such that the distance between each control point is equal, that is, the distance between each control point is 1/N. This third mapping scheme has the advantage in that it is completely reversible. However, the shape of the composite curve resulting from a distort operation is highly dependent on the location of control points. If the control points are generally equally dispersed throughout the composite curve, then the distortion of the curve will be smooth over its entire length. However, if some control points are bunched together in clusters while other control points are farther apart, then there could be more abrupt changes in the shape of the curve after the distort operation.

Once the parameters Ty (y=f, f+, g−, g, g+, h−, h, h+, i−, i, i+, j−, and j) for the control points of the composite curve 304 are derived, the program determines if the parameters along the line t are monotonic, that is, Tf is less than Tf+, Tf+ is less than Tg−, Tg− is less than Tg, and so forth. If the parameters Ty are monotonic, nothing further is done.

Otherwise, the non-monotonic points Tp, Tp−, or Tp+ are flipped at step 458 about the point Tp at which the projection mapping became non-monotonic. Thus, in FIG. 3A, the parameters Tf and Tf+ are each greater in value than the parameter Tg for point Eg. To make the mapping monotonic, the parameters Tf and Tf+ are "unfolded" about the point where the mapping reverses direction (in this case parameter Tg−) to new parameters Tf' and Tf+', respectively. Once unfolded, the distance between Tg− and Tf' is the same as the distance between Tg− and Tf, and the distance between Tg− and Tf+' is the same as the distance between Tg− and Tf+.

Projection mapping is reversible because for displacements in opposite directions, the line t onto which the points are projected will be the same (that is, perpendicular to the vectors through which the selected points are dragged), and therefore the t values will be the same. Consequently, the distortions of the curve will be exactly reversed if a curve is first dragged through a vector U followed by a drag through a vector −U without any intervening operation.

Projection mapping is more calculation intensive than distance mapping. In a typical user interaction, the path through which the selected points are dragged to distort the composite curve is not likely to follow a straight line, but rather, the path of the cursor in a single drag operation is approximated as a succession of multiple vector displacements V1, V2, . . . , Vn from a common point. If intermediate positions of the composite curve are to be displayed during the curve distort operation, the parameters Cp−, Cp+, and Cp must be reapplied for each vector V1, V2, . . . , Vn. With projection mapping, the parameters Tp and Cp must be recalculated for each vector displacement V1, V2, . . . , Vn since the orthogonal line segment t changes for each new vector. In contrast, if distance mapping is used, the factors Cp−, Cp, and Cp+ need be computed only once at the beginning of the drag (that is, when the user presses the mouse button), and then applied for each new value of the vector displacement V1, V2, . . . , Vn as the path of the move operation changes direction while the mouse button remains pressed. As a result, the amount of computation for each single move operation is minimized with distance mapping.

Referring again to the example of FIG. 2A, after the control points of the composite curve have been mapped to the straight line t, the second step of the mapping scheme (step 404 of FIG. 2B) maps the parameters Tp, Tp−, and Tp+ to scale factors Cp, Cp−, and Cp+ derived from the interpolation curve IC for control points between Ea and Ee. Parameters Tb, Tc, and Td associated with free segment end points are mapped to points on the interpolation curve IC. The value of the parameter Ce is 1, since the point Ee is the selected point dragged through a displacement V with the cursor, and the value of the parameter Ca is zero since it is associated with the fixed point Ea.

For parameters Ta+, Tb−, Tb+, Tc−, Tc+, Td−, Td+, and Te− associated with slope points, the values are evaluated at lines Ya, Yb, Yc, Yd, and Ye which are tangent to the interpolation curve IC at t=Ta, Tb, Tc, Td, and Te, respectively. As a result, the values Ca+, Cb−, Cb+, Cc−, Cc+, Cd−, Cd+, and Ce− are not on the interpolation curve IC.

The interpolation curve IC of FIG. 2A satisfies the following constraints:

$IC(0)=0,$ $IC(1)=1,$ $dIC(0)/dt=0,$ and $dIC(1)/dt=0.$

The first two constraints follow from the fact that point Ea is fixed (and thus does not move) and point Ee is selected (and thus moves by the full amount specified by the user). The latter two constraints specify that the slope of the interpolation curve at t=0 and t=1 is zero, which also effectively specifies that the slopes of the composite curve at its curve end points do not change. A cubic polynomial solution of the interpolation curve IC is given in Eq. 5. By placing points Cp+ and Cp− along the tangent line Yp, the colinearity of lines (P−−P) and (P−P+) is maintained.

$$IC(t)=t*t*(3.0-2.0*t) \tag{Eq.5}$$

The values of parameters Ca+ through Ce− are each between the value of Ca and Ce, that is, between 0 and 1. Note that although slope point Ea+ and Ee− are technically free points, the values of Ca+ and Ce− are constrained by the condition that the slopes of the interpolation curve IC(t) at t=0, 1 are zero. Thus, the value of Ca+ is zero and the value of Ce− is 1.

In addition to the ability to move a curve by dragging a selected segment end point or end points, the slope of a composite curve at its curve end points can also be adjusted. Referring to FIGS. 2D and 2E, a composite curve 310 is associated with a single, approximating Bezier curve segment 312, which approximates the composite curve 310 using a least squares fit to points sampled from the composite curve 310. The approximating Bezier segment 312 is defined by segment end points P0 and P3 and slope points P1 and P2 (referred hereinafter as "pseudo" slope points P1 and P2 of the composite curve 310). The approximating segment 312 is strictly a user interface function to allow the user to adjust the slope at either curve end point Ea or curve end point Ee of the composite curve 310. Alternative schemes can be used for modifying the slope at curve end points. For example, a simpler user interface method is to define pseudo slope points P1 and P2 along a line defined between end points P0 and P3, with point P1 at a position ⅓ and point P2 at a position ⅔ along the line. As another example, the program can provide a button in the user interface selectable by the user to enter into a slope adjustment mode. Then the user can mark which curve end point is to be modified and drag an arbitrary slope adjustment point to provide a displacement vector of the slope adjustment point to adjust the slope of the composite at one of its curve end points.

To modify the slope at a composite curve end point (Ea or Ee), the user selects and drags pseudo slope point P1 or P2 of the Bezier segment 312. Selection of P1 modifies the slope at Ea and selection of P2 modifies the slope at Ee. In contrast, as discussed above, if a particular segment end point or end points of the composite curve 310 are to be moved, then the user would select segment end points Ea, Eb, Ec, Ed, or Ee and drag them by the desired displacement. Pseudo slope point P1 or P2 is dragged by a displacement vector V (as illustrated in FIG. 8) to modify the slope of the curve at end point Ea or Ee. In response to the displacement of pseudo slope point P1 or P2, the program calculates displacements for the control points of the composite curve using a two-step mapping scheme similar to that described above for movement of segment end points. The difference is in the interpolation curve used in the slope modification mapping steps. The interpolation curve must be defined such that the displacements of control points near the point P1 are larger than the other control points. Only the slope at one curve end point is adjusted, with the slope at the opposite curve end point remaining unchanged.

In FIG. 2E, the displacement vector V of pseudo slope point P1 is received at step 440. Next, the program maps the control points Ea, Ea+, Eb−, Eb, Eb+, Ec−, Ec, Ec+, Ed−, Ed, Ed+, Ee−, and Ee onto a line segment t, using either distance mapping or projecting mapping (with distance mapping shown in FIG. 2D). An interpolation curve IC(t) (which is different from the interpolation curve for moving segment end points) is then defined at step 444 on the line segment t, and the interpolation curve IC(t) must satisfy the following conditions:

$IC(0)=0,$ $IC(1)=0,$ $dIC(0)/dt >0,$ and $dIC(1)/dt =0$

The conditions specify that the values of the interpolation curve IC(t) at t=0, 1 is zero, the slope of IC(t) at t=1 is zero, and the slope of IC(t) at t=0 is greater than 0.

One type of polynomial that satisfies the conditions specified is a Bernstein polynomial, as expressed in Eq. 6.

$$IC(t)=3*t*(1.0-t)^2 \tag{Eq.6}$$

The points Ta+, Tb−, Tb, Tb+, Tc−, Tc, Tc+, Td−, Td, Td+, and Te− are then mapped at step 446 onto the interpolation curve IC(t). The mapping is the same as described in connection with the mapping scheme of FIG. 2A, in which parameters Tp associated with segment end points are mapped onto the interpolation curve IC(t), and parameters Tp− and Tp+ associated with slope points are mapped to tangent lines Yp at t=Tp. The program then calculates at step 448 the values of scale factors Cp, Cp−, and Cp+ to determine the displacements of the control points Ea through Ee. Then, at step 449, the control points are moved by the program by the calculated displacements.

Using the Bernstein polynomial of Eq. 6, the maximum movement is at a point ⅓ along line segment t, i.e., at t=⅓. Such a point does not necessarily correspond to a point Tp, Tp+, or Tp− associated with a composite curve control point.

The example of FIG. 2D shows modification of the slope at curve end point Ea of the composite curve 310. If the slope at curve end point Ee is to be modified, then the pseudo slope point P2 is selected and moved. In that case, the conditions for the interpolation curve are different, with the slope of IC(t) at t=0 equal to zero and the slope of IC(t) at t=1 less than zero. As a result, the interpolation curve of Eq. 6 is mirrored on line segment t.

In an alternative embodiment, the slope of any segment end point in a composite curve can be modified. To enable that, the program displays an approximating curve between that segment end point and the segment end point at the other end of the portion of the composite curve the user wants to select. For example, in FIG. 2D, if the portion of the composite curve to be affected is between points Eb and Ed, and the slope at Eb is to be modified, then the approximating curve will be defined between points Eb and Ed.

Pseudo slope point P1 of the shortened approximating curve can then be dragged to modify the slope at the segment end point Eb. Note that modifying the slope at segment end point Eb (since it is not a curve end point) will destroy the smooth transition between the affected curve segment (between Eb and Ec) and its adjacent curve segment (between Ea and Eb).

Exemplary curve distortions are shown below in FIGS. 5–8, in which an original curve is represented with solid lines and a modified or distorted curve is represented with dashed lines where they differ from the original curve.

Referring to FIG. 5, a multi-segment composite curve 200 can be modified by the techniques of the invention to produce a composite curve 200'. The fixed point is the segment end point E206, and the selected points are segment end points E200, E201, E202, E203, E204 and E205, which are dragged as a group to new segment end points E200'–E205', respectively. The displacements of the free points between the fixed segment end point E206 and the selected segment end point E205 are determined by the program to maintain the general shape and detail of the original curve 200 and the smoothness of transitions between the curve segments.

Referring to FIG. 6, the path modification techniques can also be applied to cyclic, or closed, curves, such as the oval 120 defined by four Bezier segments 122, 123, 124, and 125 between segment end points E120, E121, E122, E123, and E124. The only new consideration is that the points need to be dealt with cyclically, that is, the first and last points are considered adjacent. The oval 120 is modified from original path 120 to new path 120', with segment end point E120 being the fixed point and the segment end point E123 being the selected point. The remaining points are free points whose displacements are calculated by the program to maintain the circular shape of the composite curve 120'.

FIGS. 7A and 7B illustrate disjoint groups of control points moved by the program. In FIG. 7A, a six-segment composite curve 320 is distorted to a curve 320' with segment end points E320, E323, and E326 being fixed points and segment end points E321 and E324 being selected points. The control points between fixed points E320 and E323 form a first group of control points and the control points between fixed points E323 and E326 form a second group of control points. Separate mappings are performed for the two groups to determine the displacements of the free control points.

FIG. 7B illustrates four disjoint groups of control points, with two groups in composite curve 220 and two groups in composite curve 230. The fixed points are segment end points E220, E223, E225, E231, and E235, and the selected points are segment end points E221, E224, E230, and E234. In a single move operation, displacements of free points in the four disjoint groups are calculated using four separate mappings (with a mapping defined being the mapping required for control points between two fixed points). Again the slope points are adjusted to maintain the smooth transitions of the curve segments in the two composite curves 220' and 230'.

FIG. 8 illustrates the modification of the slope of a composite curve 320 at curve end point P0. The composite curve 320 includes multiple Bezier curve segments (not shown explicitly). An approximating curve 322, which is a single Bezier segment sharing common end points P0 and P3 and having pseudo slope points P1 and P2, is also displayed along with the composite curve 320. Pseudo slope point P1 is moved by a displacement vector V to point P1', and the slope of the composite curve 320 is adjusted accordingly to create composite curve 320'. The approximating curve 322 is moved to curve 322'. For further modification of the slope at either of the composite curve end points, the pseudo slope points P1' and P2 can be further moved.

Referring to FIGS. 9A and 9B, curve segments need to be drawn as well as moved. As explained above, a Bezier segment is defined by four control points P0, P1, P2, and P3, in which points P0 and P3 are segment end points and points P1 and P2 are slope points. To provide user feedback during a drawing operation, the program creates and displays a curve between segment end point P0 and the cursor at the time the mouse button is pressed, and tracks the cursor with a "rubber band" Bezier segment using the current cursor position as the instantaneous location of the segment end point P3 and calculated positions for slope points P1 and P2, as will be described.

Referring to FIG. 9A, the program determines at step 500 if the mouse button is pressed. If so, the program checks at step 501 if the cursor is located within a predetermined radius of a control point of an existing Bezier curve segment. If so, the program at step 502 moves the control point to a position indicated by the cursor.

If the cursor is not in the predetermined radius of a control point when the mouse button is pressed, then the program recognizes that curve segment creation is desired, and the program next determines at step 503 if a modifier key (e.g., Ctrl key) is pressed or if no other curve is displayed on the computer screen.

If the user presses a modifier key (such as the Ctrl key), or some other activation means, while pressing the mouse button if another curve segment has already been created, then that indicates the user desires to create a curve segment separate from the existing segment. Otherwise, the program will concatenate the new segment to the existing segment to form a sequence of curve segments.

If a separate curve segment is desired (that is, either the modifier key is pressed or no other curve segment has been created), then the first segment end point P0 is defined at step 504 as the point of the cursor when the user pressed the mouse button. Next, the program detects at step 506 when the mouse button to be released. When the mouse button is released, then the position of the cursor at the time of release is defined at step 508 as an intermediate slope point S1, as shown in FIG. 10A. The point S1 is selected by the user to indicate the direction of a vector S from point P0 to point S1. Slope point P1 will be located along a line in the direction of the vector S. Further, the curve segment is tangent the vector S at the segment end point P0.

After the point S1 has been defined at step 508, the program determines at step 510 if the mouse button has been pressed again. If so, then the current position of the cursor is defined at step 512 as the position of the segment end point P3. The slope points P1 and P2 are also calculated at step 512 for the current position of the segment end point P3, and the curve segment is displayed to provide user feedback of the shape of the curve segment.

The positions of points P1 and P2 are calculated by the program in step 512 so that the curve is a close approximation of an arc of a circle that goes through P0 and the cursor, as shown in FIG. 9B. As the cursor is dragged by the user, the instantaneous position of the segment end point P3 follows the cursor (as indicated by points P3, P3', and P3"), and the slope points P1 and P2 are recalculated (as indicated by points P1, P2; P1', P2'; and P1", P2") to maintain an approximation of a circular arc.

The program then determines at step 514 if the mouse button has been released. If not, the current position of the cursor continues to indicate the position of the segment end point P3. If the mouse button is released, then the final position of the segment end point P3 is specified at step 516 as being the position of the cursor when the mouse button was released. The final positions of slope points P1 and P2 are also calculated and the curve segment is displayed.

If, at step 502, the modifier key is not pressed and a curve segment has already been created, then the program assumes that the user desires to create the next segment of a composite curve. As shown in FIG. 10B, the point P2 of the first curve segment 600 is reflected through the point P3 to define the position of the intermediate slope point S1' for the next curve segment 602. The line (P2–P3) is collinear with the line (P3–S1') to create a smooth transition between the curve segments 600 and 602. Once the mouse button is pressed, the current position of the cursor is used as the instantaneous position of the segment end point P3' of the new curve segment 602, and the positions of slope points P1' and P2' of the curve segment 602 are calculated as the segment end point P3' changes positions. The program then detects at step 514 if the mouse button has been released, at which time the final position of the segment end point P3' is determined. The process described above can be applied to create additional curve segments to add to the composite curve.

Referring again to FIG. 10A, the mathematics for calculating the positions of slope points P1 and P2 is presented in Equations 7–13. In the equations, the points P0, P1, P2, P3, and S1 are expressed as vectors in an arbitrary coordinate system.

$$W = P3 - P0 \quad \text{(Eq. 7)}$$

$$S = S1 - P0 \quad \text{(Eq. 8)}$$

$$\cos A = W \cdot S / |W| * |S| \quad \text{(Eq. 9)}$$

$$m = 2 * |W| / [3 * (1 + \cos A)] \quad \text{(Eq. 10)}$$

$$v = 1 - (2 * m * \cos A / |W|) \quad \text{(Eq. 11)}$$

$$P1 = P0 + m * S / |S| \quad \text{(Eq. 12)}$$

$$P2 = P1 + v * W \quad \text{(Eq. 13)}$$

W is a vector defined as the difference between vectors P3 and P0, and S is a vector defined as the difference between vectors S1 and S0. An angle A is defined as the angle between the vector W and the vector S. Equations 9 and 10 calculate scalar values m and v, with the value m used as a scale factor of a unit vector pointing in the direction of the S vector to derive the vector P1 in Equation 11, and the value v used as a scale factor of the vector W to derive the vector P2 in Equation 12.

Referring to FIG. 11, a program for creating and modifying curves in accordance with this specification may be implemented in digital electronic circuitry or in computer hardware, firmware, software, or in combinations of them, such as in a computer system 500. The computer system 500 includes a central processing unit (CPU) 502 connected to a internal system bus 504. The storage media in the computer system 500 include a main memory 506 (which can be implemented with dynamic random access memory devices), a hard disk drive 508 for mass storage, and an electrically erasable programmable read only memory (EEPROM) 510. The main memory 506 and EEPROM 510 are connected to the bus 504, and the hard disk drive 508 is coupled to the bus 504 through a hard disk drive controller 512.

Apparatus of the invention may be implemented in a computer program product tangibly embodied in a machine-readable storage device (such as the hard disk drive 508, main memory 506, or EEPROM 510) for execution by the CPU 502. Suitable processors include, by way of example, both general and special purpose microprocessors. Generally, a processor will receive instructions and data from the read-only memory 510 and/or the main memory 506. Storage devices suitable for tangibly embodying computer program instructions include all forms of non-volatile memory, including by way of example semiconductor memory devices, such as EPROM, EEPROM, and flash memory devices; magnetic disks such as the internal hard disk drive 508 and removable disks; magneto-optical disks; and CD-ROM disks. Any of the foregoing may be supplemented by, or incorporated in, specially-designed ASICs (application-specific integrated circuits).

The computer system 500 further includes an input/output (I/O) controller 514 connected to the bus 504 and which provides a keyboard interface 516 (for connection to an external keyboard), a mouse interface 518 (for connection to an external mouse or other pointer device), and a parallel port interface 520 (for connection to a printer). In addition, the bus 504 is connected to a video controller 522 which couples to an external computer monitor or display 524. Data associated with an image for display on the computer monitor 524 (such as the curves) are provided over the system bus 504 by application programs to the video controller 522.

Other embodiments are within the scope of the following claims. For example, the steps of the invention may be changed by those skilled in the art and still achieve desirable results. The various received commands can be provided to a computer in a number of different ways; for example, mouse gestures, keyboard strokes, and a graphical user interface can be used to communicate the commands to the computer system.

What is claimed is:

1. A computer-implemented method comprising:

displaying a composite curve on a display device of a computer system having a graphical user interface, the composite curve being made up of multiple segments connected end to end, each segment having multiple control points including two segment end points, the control points of the segments being the control points of the composite curve;

while the composite curve is being displayed, interactively receiving from the user one or more selection inputs through the graphical user interface, the selection inputs causing each of the control points to be identified as exactly one of a fixed control point, a selected control point, or a free control point, the selection inputs identifying multiple control points as selected control points; and after the selection inputs are received, receiving from the user a displacement input through the graphical user interface, and then, in interactive response to the displacement input, moving the multiple selected control points as a rigid group on the display device and displaying a recalculated composite curve according to the displacement of the selected control points, the composite curve being recalculated leaving the fixed control points fixed and moving the free control points by an interpolated amount so as to maintain the general shape and details of the composite curve and to maintain smooth transitions between segments of the composite curve.

2. The method of claim 1, further comprising:

mapping all the free control points that are segment end points to corresponding points on a line t;

defining an interpolation curve IC(t) on the line t;

projecting the points on the line t perpendicularly to corresponding values of the interpolation curve IC(t) to find corresponding scale factors; and multiplying the scale factors by the displacement of the selected points to determine the corresponding displacements of the free control points that are segment end points.

3. The method of claim 2, wherein the control points include slope points associated with segment end points, the method further comprising:

mapping a free slope point to a point Tp+ on the line t, the free slope point being associated with a segment end point mapped to a point Tp on the line t;

defining a line Yp(t) tangent to the interpolation curve IC(t) at t equals Tp;

projecting the point Tp+ perpendicularly from the line t to the value of the line Yp(t) at t equals Tp+ to find a scale factor for the free slope point; and multiplying the scale factors of the free segment end point and free slope point by the displacement of the selected points to determine the displacements of the free segment end point and free slope point.

4. The method of claim 2, wherein the corresponding scale factor is equal to the value of the interpolation curve IC(t).

5. The method of claim 4, further comprising:

defining the value of IC(t) to be in a range from 0 to 1, whereby the free control point is moved by a displacement less than the displacement of the selected points.

6. The method of claim 2, wherein the curve has a first control point, the method further comprising:

defining a polyline that passes through the segment end points of the composite curve;

calculating the total length of the polyline, wherein the position of a corresponding point on line t is defined by the ratio of (i) the polyline length between the first control point and the corresponding segment end point to (ii) the total length of the polyline.

7. The method of claim 2, further comprising:

defining the line t as being perpendicular to the direction of the displacement, wherein the step of mapping free control points projects the free control points of the curve perpendicularly onto the line t.

8. The method of claim 2 wherein the interpolation curve is defined as a third-order cubic curve.

9. The method of claim 1, further comprising:

identifying in response to user input a first group of control points having a selected control point and a free control point and a second group of control points having a selected control point and a free control point, the first group of control points being separated from the second group of control points by a fixed control point;

receiving a single displacement factor for both the first group of selected control points and the second group of selected control points;

mapping the free control point of the first group to a point Tp1 on a first line t1, and mapping the free control point of the second group to a point Tp2 on a second line t2;

defining a first interpolation curve IC(t1) on the first line t1, and defining a second interpolation curve IC(t2) on the second line t2;

projecting the point Tp1 to the first interpolation curve IC(t1) at t1 equals Tp1 to find a first scale factor, and projecting the point Tp2 to the second interpolation curve IC(t2) at t2 equals Tp2 to find second scale factor; and multiplying the first scale factor by the single displacement factor to determine the displacement of the first group free control point, and multiplying the second scale factor by the single displacement factor to determine the displacement of the second group free control point.

10. The method of claim 1, wherein the multiple segments comprise Bezier segments.

11. The method of claim 1, further comprising:

receiving multiple displacement inputs while the curve is being displayed and in response to each displacement input moving the selected points as a rigid group on the display device and displaying a recalculated curve according to the displacement as recited in claim 1.

12. The method of claim 1, where the user input specifying the displacement specifies both a magnitude and a direction of the displacement.

13. The method of claim 1, where receiving an input specifying a displacement comprises receiving a user interface gesture of dragging the selected control points.

14. A computer-implemented method comprising:

displaying composite curves on a display device of a computer system having a graphical user interface, the composite curves being made up of multiple segments connected end to end, each segment having multiple control points including two segment end points, the control points of the segments being the control points of the composite curves;

while the composite curves are being displayed, interactively receiving from the user one or more selection inputs through the graphical user interface, the selection inputs causing each of the control points to be identified as exactly one of a fixed control point, a selected control point, or a free control point, the selection inputs identifying multiple control points as selected control points; and after the selection inputs are received, receiving from the user a displacement input through the graphical user interface, and then, in interactive response to the displacement input, moving the multiple selected control points as a rigid group on the display device and displaying a recalculated composite curve according to the displacement of the selected control points, the composite curve being recalculated leaving the fixed control points fixed and moving the free control points by an interpolated amount so as to maintain the general shape and details of the composite curve and to maintain smooth transitions between segments of the composite curve.

15. The method of claim 14, wherein the multiple segments comprise Bezier segments.

16. A computer program residing on a computer-readable medium comprising instructions for causing a computer to:

display a composite curve on a display device of a computer system having a graphical user interface, the composite curve being made up of multiple segments connected end to end, each segment having multiple control points including two segment end points, the control points of the segments being the control points of the composite curve;

receive interactively from the user, while the composite curve is being displayed, one or more selection inputs through the graphical user interface, the selection inputs causing each of the control points to be identified as exactly one of a fixed control point, a selected control point, or a free control point, the selection inputs identifying multiple control points as selected control points; and receive from the user, after the selection inputs are received, a displacement input through the graphical user interface, and then, in interactive response to the displacement input, move the multiple selected control points as a rigid group on the display device and display a recalculated composite curve according to the displacement of the selected control points, the composite curve being recalculated leaving the fixed control points fixed and moving the free control points by an interpolated amount so as to maintain the general shape and details of the composite curve and to maintain smooth transitions between segments of the composite curve.

17. The computer program of claim 16, further comprising instructions for causing the computer to:

map all the free control points that are segment end points to corresponding points on a line t;

define an interpolation curve IC(t) on the line t;

project the points on the line t perpendicularly to corresponding values of the interpolation curve IC(t) to find corresponding scale factors; and multiply the scale factors by the displacement of the selected points to determine the corresponding displacements of the free control points that are the segment end points.

18. The computer program of claim 17, wherein the control points include slope points associated with segment end points, the computer program further comprising instructions for causing the computer to:

map a free slope point to a point Tp+ on the line t, the free slope point being associated with a segment end point mapped to a point Tp on the line t;

define a line Yp(t) tangent to the interpolation curve IC(t) at t equals Tp;

project the point Tp+ perpendicularly from the line t to the value of the line Yp(t) at t equals Tp+ to find a scale factor for the free slope point; and multiply the scale factors of the free segment end point and free slope point by the displacement of the selected points to determine the displacements of the free segment end point and free slope point.

19. The computer program of claim 16, further comprising instructions for causing the computer system to:

define the value of IC(t) to be in a range from 0 to 1, whereby the free control point is moved by a displacement less than the displacement of the selected points.

20. The computer program of claim 16, further comprising instructions for causing the computer to:

identify in response to user input a first group of control points having a selected control point and a free control point and a second group of control points having a selected control point and a free control point, the first group of control points being separated from the second group of control points by a fixed control point;

receive a single displacement factor for both the first group of selected control points and the second group of selected control points;

map the free control point of the first group to a point Tp1 on a first line t1, and map the free control point of the second group to a point Tp2 on a second line t2;

define a first interpolation curve IC(t1) on the first line t1, and define a second interpolation curve IC(t2) on the second line t2;

project the point Tp1 to the first interpolation curve IC(t1) at t1 equals Tp1 to find a first scale factor, and project the point Tp2 to the second interpolation curve IC(t2) at t2 equals Tp2 to find second scale factor; and multiply the first scale factor by the single displacement factor to determine the displacement of the first group free control point, and multiply the second scale factor by the single displacement factor to determine the displacement of the second group free control point.

21. The computer program of claim 16, wherein the multiple segments comprise Bezier segments.

22. A computer program residing on a computer-readable medium, the computer program comprising instructions for causing a computer to:

display a composite curve on a display device of a computer system having a graphical user interface, the composite curve being made up of multiple segments connected end to end, each segment having multiple control points including two segment end points, the control points of the segments being the control points of the composite curve;

receive interactively from the user, while the composite curve is being displayed, one or more selection inputs through the graphical user interface, the selection inputs causing each of the control points to be identified as exactly one of a fixed control point, a selected control point, or a free control point, the selection inputs identifying multiple control points as selected control points; and receive from the user, after the selection inputs are received, a displacement input through the graphical user interface, and then, in interactive response to the displacement input, move the multiple selected control points as a rigid group on the display device and display a recalculated composite curve according to the displacement of the selected control points, the composite curve being recalculated leaving the fixed control points fixed and moving the free control points by an interpolated amount so as to maintain the general shape and details of the composite curve and to maintain smooth transitions between segments of the composite curve.

23. The computer program of claim 22, wherein the multiple segments comprise Bezier segments.

24. A computer-implemented method comprising:

displaying a curve to a user, the curve being a composite curve made up of multiple segments connected end to end, each of the segments having a plurality of control points;

receiving a user input selecting an endpoint of the composite curve at which the slope of the composite curve is to be modified and defining a slope displacement:

mapping each control point that is a segment end point of the composite curve to a corresponding point Tp on a line t;

defining an interpolation curve IC(t) on the line t, the interpolation curve satisfying the conditions that IC(0)=0, IC(1)=1, dIC(0)/dt>0, and dIC(1)/dt=0;

projecting each point Tp to the value of the interpolation curve IC(t) at t equals Tp to find a corresponding scale factor; and multiplying the corresponding scale factor by the displacement to determine the displacement of the corresponding control point.

25. The method of claim 24, wherein the interpolation curve IC(t) is a Bernstein polynomial.

26. The method of claim 24, further comprising:

providing as a user interface function an approximating segment computed to fit the composite curve, the approximating segment having one slope control point associated with each endpoint of the approximating segment; and receiving a user input selecting and displacing one of the slope control points, the user by so doing selecting the endpoint at which the slope is to be modified and defining the slope displacement vector.

27. The method of claim 24, wherein segments of the composite curve are Bezier segments.

28. The method of claim 24, wherein the composite curve is a portion of a larger composite curve.

29. A computer program, residing on a computer-readable medium, the computer program comprising instructions for causing the computer system to:

display a curve to a user, the curve being a composite curve made up of multiple segments connected end to end, each of the segments having a plurality of control points;

receive a user input selecting an endpoint of the composite curve at which the slope of the composite curve is to be modified and define a slope displacement;

map each control point that is a segment end point of the composite curve to a corresponding point Tp on a line t;

define an interpolation curve IC(t) on the line t, the interpolation curve satisfying the conditions that IC(0)=0, IC(1)=1, dIC(0)/dt>0, and dIC(1)/dt=0;

project each point Tp to the value of the interpolation curve IC(t) at t equals Tp to find a corresponding scale factor; and multiply the corresponding scale factor by the displacement to determine the displacement of the corresponding control point.

30. The computer program of claim 29, wherein the interpolation curve IC(t) is a Bernstein polynomial.

* * * * *